(12) United States Patent
Choi (10) Patent No.: US 8,799,936 B2
(45) Date of Patent: Aug. 5, 2014

(54) COOPERATIVE FILTERING ALGORITHM-BASED PERSONAL PREFERENCE PROGRAM RECOMMENDATION SYSTEM FOR IPTV

(75) Inventor: Joong-in Choi, Seoul (KR)

(73) Assignee: Byuck San Power, Ltd., Seoul (KR)

( * ) Notice: Subject to any disclaimer, the term of this patent is extended or adjusted under 35 U.S.C. 154(b) by 0 days.

(21) Appl. No.: 13/807,513

(22) PCT Filed: Jun. 27, 2011

(86) PCT No.: PCT/KR2011/004670
§ 371 (c)(1),
(2), (4) Date: Mar. 8, 2013

(87) PCT Pub. No.: WO2012/002685
PCT Pub. Date: Jan. 5, 2012

(65) Prior Publication Data
US 2013/0263168 A1  Oct. 3, 2013

(30) Foreign Application Priority Data

Jul. 2, 2010 (KR) .................. 10-2010-0063705
May 20, 2011 (KR) .................. 10-2011-0047758

(51) Int. Cl.
| | |
|---|---|
| H04H 60/32 | (2008.01) |
| H04H 60/56 | (2008.01) |
| G06F 3/00 | (2006.01) |
| G06F 13/00 | (2006.01) |
| H04N 5/445 | (2011.01) |

(52) U.S. Cl.
USPC .................. 725/14; 725/12; 725/46; 725/56

(58) Field of Classification Search
None
See application file for complete search history.

(56) References Cited

U.S. PATENT DOCUMENTS

| | | | |
|---|---|---|---|
| 7,757,250 B1 * | 7/2010 | Horvitz et al. ................. | 725/35 |
| 2004/0076936 A1 * | 4/2004 | Horvitz et al. ................. | 434/236 |
| 2009/0271826 A1 * | 10/2009 | Lee et al. ........................ | 725/46 |
| 2011/0247038 A1 * | 10/2011 | Roberts et al. ................ | 725/46 |

FOREIGN PATENT DOCUMENTS

| | | | | |
|---|---|---|---|---|
| EP | 1538838 A1 * | 6/2005 | ............ | H04N 7/173 |
| KR | 10-2005-0053345 | 6/2005 | | |
| KR | 10-2005-0061548 | 6/2005 | | |
| KR | 10-2008-0074681 | 8/2008 | | |

* cited by examiner

Primary Examiner — Brian T Pendleton
Assistant Examiner — Alexander Gee
(74) Attorney, Agent, or Firm — Hoffman & Baron, LLP (57) ABSTRACT

A system for recommending personalized favorite programs or channels to internet protocol television (IPTV) users based on a collaborative filtering algorithm is disclosed. The system includes a broadcast provider as an IPTV broadcast provider that provides users with TV contents through the Internet, a service server to receive a broadcast signal and program information from the broadcast provider, to store corresponding information in respective databases, to calculate the program information based on a recommendation algorithm to quantitatively calculate priority, and to list the program information in recommendation order based on the currently broadcast or reproduced program, a relay device to receive recommended program list information and a broadcast signal from the service server and to transmit the recommended program list information and the broadcast signal through a network, and a TV to output the recommended program list information and the broadcast signal from the relay device.

8 Claims, 6 Drawing Sheets

|  |  | Grey's Anatomy | Avatar | Monday NFL | ... | 60 Minutes |
|---|---|---|---|---|---|---|
|  |  | Drama | Movie | Sports | ... | News |
| Mike | 21,M, Student | 7 | 0 | 10 |  | 0 |
| Jessica | 34,F, Housewife | 8 | 0 | 2 |  | 3 |
|  |  |  |  |  |  |  |
| John | 41,M, Engineer | 5 | 10 | 8 |  | 10 |
|  | 48,M, Doctor | 7 | 10 | 9 |  | ? |

Fig. 6

COOPERATIVE FILTERING ALGORITHM-BASED PERSONAL PREFERENCE PROGRAM RECOMMENDATION SYSTEM FOR IPTV

This application is the U.S. National Phase of, and Applicants claim priority from, International Application No. PCT/KR2011/004670 filed Jun. 27, 2011, Korean Patent Application No. 10-2010-0063705 filed Jul. 2, 2010 and Korean Patent Application No. 10-2011-0047758 filed May 20, 2011, all of which are incorporated herein by reference.

BACKGROUND OF THE INVENTION

1. Field of the Invention

The present invention relates to a system for recommending desired programs or channels to internet protocol television (IPTV) users, and more particularly to a system for recommending personalized favorite programs or channels to IPTV users based on a collaborative filtering algorithm.

2. Description of the Related Art

As an internet protocol (IP)-based infrastructure is added to existing television (TV) receiving infrastructures, such as terrestrial broadcasting, cable broadcasting, and satellite broadcasting, the number of programs that users can select is infinite. For this reason, it is important and difficult for users to accurately and rapidly search for and select desired programs. Technology enabling such search and selection will be very useful. This may be assumed when considering usefulness and value at search engines, such as Google, on the Internet. Consequently, it will be very useful if a search tool, such as Google, can be used even in a TV viewing domain in which the number of programs that can be viewed is infinitely increased as in the Internet. However, it should be recognized that basic behavior patterns of users are different when using the Internet and viewing TV. That is, when using the Internet, a user inputs a desired keyword using a keyboard in a lean-forward posture in which the user sits at a personal computer (PC) on a desk in an office. When viewing TV, on the other hand, a user searches and selects a desired channel while simply changing channels from left to right and up and down using a remote controller in a lean-back posture in which the user lays on a sofa in a living room. When viewing TV, therefore, input is not carried out using an explicit method, such as keyboard input, but using an implicit method. Consequently, search is carried out through navigation of a hierarchical menu in a manner similar to search and selection of a program on a fixed menu as in early Yahoo. As the number of channels and programs is gradually increased, however, such a method has become a fundamental obstacle to a long tail market such as is found on the Internet. That is, most of the produced TV programs are not selected by viewers or are laid unused. For example, 30 million hours of programs are produced in America a year. Since the average TV viewing time per year per person is 16,400 hours, however, 0.005% of the produced programs are viewed and 99.995% of the produced programs are laid unused. Also, in case of an IPTV, navigation or program change time is too slow during search of programs to directly see and select the programs with the result that search is not substantially possible.

Meanwhile, broadcast information or an electronic program guide (EPG) provided through broadcast reception or a network in the existing TV or set top box (STB)/personal video recorder (PVR) provides broadcast programs in various manners.

However, it is very inconvenient and difficult for a user to select and view a desired program on a time-based broadcast information screen using an electronic program guide (EPG) configured in an enormous table form when more than 10,000 channels are present.

The most representative method of the electronic program guide is two-dimensional provision of a channel-based/time-based table or a one-dimensional provision of currently broadcast channel information.

Alternatively, such EPG information may be edited to display favorite channels in an EPG form. This displays channels in predetermined order, and the order may be changed according to a favorite degree of individuals.

So far, however, a technology of estimating a favorite degree of a user group based on a favorite degree of another user group and providing a recommended program list has not been proposed.

An IPTV is a service to provide users with TV contents through the Internet. The IPTV provides bi-directional services to the users unlike existing terrestrial broadcasting, cable broadcasting, and satellite broadcasting service systems. Fields related to the present invention include interactive TV related technologies. Specifically, fields related to the present invention include a high-ranking contents service platform technology, a broadband communication network technology, a load distribution technology, and a set top box (SIB) hardware, software, and remote control technology. A favorite program recommendation technology is referred to as a collaborative filtering technology, which quantifies a relation degree between viewers or users and programs, stores the quantified relation degree between viewers or users and programs in a database, and calculates a favorite degree from the quantified relation degree between viewers or users and programs stored in the database.

Collaborative filtering is a technology used in a personalization and recommendation algorithm. Specifically, collaborative filtering is a technology of estimating a favorite degree of a user based on a favorite degree of another user group to programs. Such a collaborative filtering technology has already widely used on electronic commerce sites, such as amazon.com, to recommend goods. Also, the collaborative filtering technology has been widely used in portal sites to recommend associative search words or associative motion pictures.

Such a collaborative filtering (CF) method includes a memory-based CF method, a model-based method, and a hybrid or contents-based CF method. In the memory-based CF method, it is necessary to first calculate similarity between users or items. A weighted value of a favorite degree is calculated based on the similarity, and a recommended program list is generated according to the weighted value. To this end, a correlation-based similarity calculation method and a vector cosine-based similarity calculation method are representatively used. An estimated value of a favorite degree of an active user to a new item is calculated using these methods, and a recommended program list is generated based on the estimated value.

SUMMARY OF THE INVENTION

Therefore, the present invention has been made in view of the above problems, and it is an object of the present invention to provide a system for recommending personalized favorite programs or channels to internet protocol television (IPTV) users based on a collaborative filtering algorithm that is capable of generating a personalized real-time recommended program list, displaying the recommended program list on a TV screen, and efficiently recommending desired channels or programs to the IPTV users based on the collaborative filtering algorithm to search and select programs from the recommended program list.

In accordance with the present invention, the above and other objects can be accomplished by the provision of a system for recommending personalized favorite programs or channels to IPTV users based on a collaborative filtering algorithm, the system including a broadcast provider as an IPTV broadcast provider that provides users with TV contents through the Internet, a service server to receive a broadcast signal and program information from the broadcast provider, to store corresponding information in respective databases, to calculate the program information based on a recommendation algorithm to quantitatively calculate priority, and to list the program information in recommendation order based on the currently broadcast or reproduced program, a relay device to receive recommended program list information and a broadcast signal from the service server and to transmit the recommended program list information and the broadcast signal through a network, and a TV to output the recommended program list information and the broadcast signal from the relay device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, a system for recommending personalized favorite programs or channels to internet protocol television (IPTV) users based on a collaborative filtering algorithm according to an embodiment of the present invention will be described in detail with reference to the accompanying drawings.

Figure 1A:
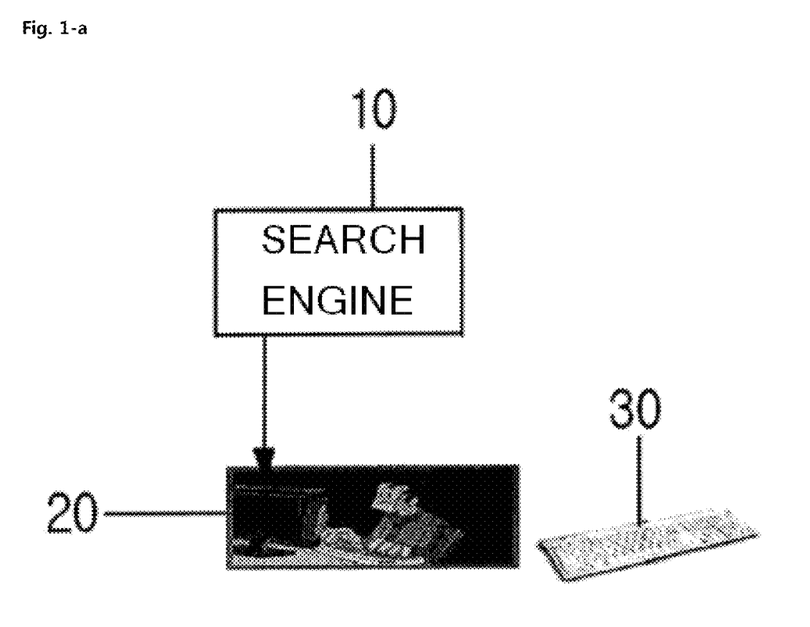
FIG. 1A is a conceptual view showing that a user searches for desired contents using a search engine.
Figure 1B:
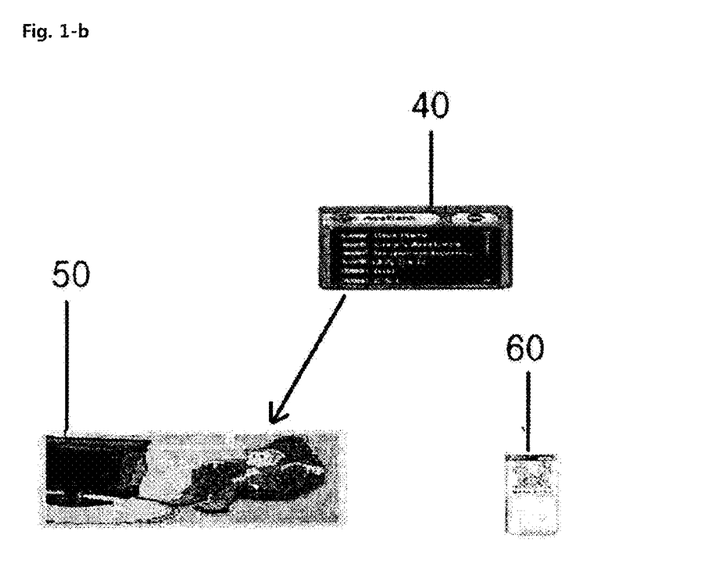
FIG. 1B is a conceptual view showing a process of recommending favorite TV programs or channels according to the present invention.

FIG. 1A is a conceptual view showing that a user searches for desired contents using a search engine, and FIG. 1B is a conceptual view showing a process of recommending favorite TV programs or channels according to the present invention.

As can be seen from a monitor screen 20 of FIG. 1A, a user inputs a desired keyword using a keyboard 30 through a search engine 10 in a lean-forward posture in which the user sits at a personal computer (PC) on a desk. That is, the user searches for contents using metadata regarding contents to be searched.

For TV program search, on the other hand, as can be seen from a TV screen 50 of FIG. 1B, a user searches for a desired program while changing TV screens using a remote controller 60 in a lean-back posture in which the user lays on a sofa. However, if the number of programs is large, it takes much time and it is inconvenient to carry out such a program search process. For this reason, a function to recommend programs to the user is necessary. The present invention generates such a function based on a recommendation algorithm through collaborative filtering as in a search engine, such as Google, and provides users with the generated function in the form of a personalized recommended program list 40.

Figure 2:
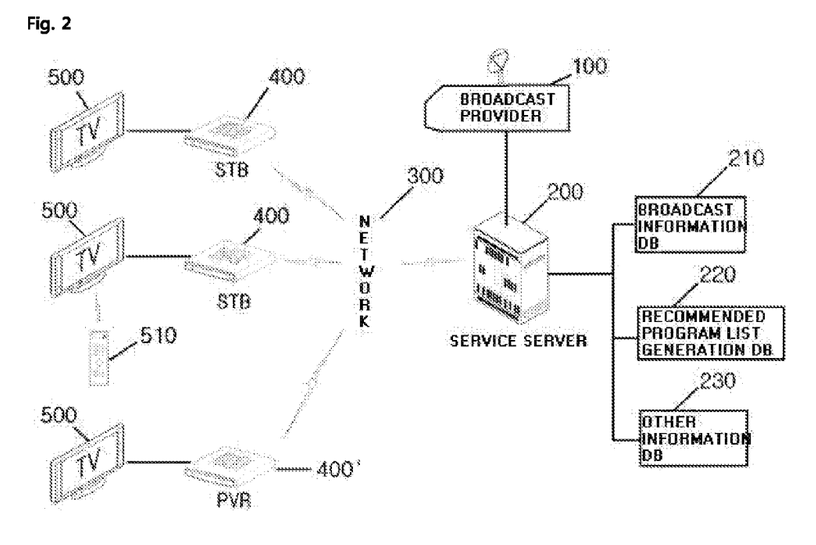
FIG. 2 is a block diagram showing a system for recommending personalized favorite programs or channels to internet protocol television (IPTV) users based on a collaborative filtering algorithm according to the present invention.

FIG. 2 is a block diagram showing a system for recommending personalized favorite programs or channels to IPTV users based on a collaborative filtering algorithm according to the present invention.

As shown in FIG. 2, the system according to the present invention includes a broadcast provider 100, a service server 200, a network 300, set top boxes (STBs) 400, a personal video recorder (PVR) 400', TVs 500, and a remote controller 510. The service server 200 includes a broadcast information database (DB) 210, a recommended program list generation DB 220, and an other information DB 230.

The broadcast provider 100 is, but is not limited to, an IPTV broadcast provider that provides users with TV contents through the Internet. For example, the broadcast provider 100 may include a terrestrial broadcast provider, a cable broadcast provider, and a satellite broadcast provider. The service server 200 receives a broadcast signal and program information from the broadcast provider 100, stores corresponding information in the respective databases, calculates the program information based on a recommendation algorithm, such as Aco Rank, to quantitatively calculate priority like Page Rank of Google, and lists the program information in recommendation order based on the currently broadcast or reproduced program. The STBs 400 and the PVR 400' are relay devices that receive recommended program list information and a broadcast signal from the service server 200 and transmit the recommended program list information and the broadcast signal to the TVs 500 through the network 300.

The service server 200 includes a broadcast information database (DB) 210 to store program information for each channel or each time zone received from the broadcast provider 100 in real time, a recommended program list generation DB 220 to provide users with a personalized recommended program list in real time using a collaborative filtering method of quantifying and calculating a relationship matrix of users and programs through a memory-based collaborative filtering (CF) algorithm, and an other information DB 230 to store other information data.

Figure 3:
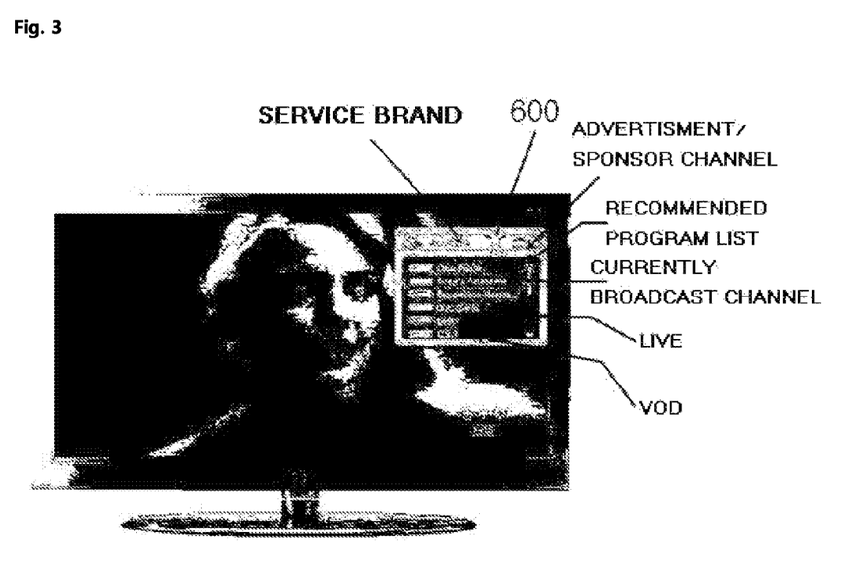
FIG. 3 is a view showing a recommended program list realized by the present invention.

FIG. 3 is a view showing a recommended program list realized by the present invention.

In a recommended program list generated by the recommended program list generation DB 220, titles or representative images may be listed. A desired program may be selected using up and down buttons of the remote controller 60 shown in FIG. 1. Alternatively, the recommended program list may be scrolled up and down using the remote controller after the recommended program list disappears to broadcast or reproduce a program selected from recommended programs through a change function as if changing channels on a conventional TV.

As shown in FIG. 3, video on demand (VOD) programs as well as currently broadcast live programs are listed in a recommended program list 600. Particularly for a hybrid IPTV or a SkyQook TV, methods of receiving live programs and VOD programs may differ based on satellite or IP. However, users may simultaneously select these programs from a list, thereby achieving seamless, integrated, and simple search and viewing. Generally, program reproduction time of IP-based VOD programs is slower than that of live programs, which must be solved.

According to the present invention, head portions of the recommended programs are previously downloaded and temporarily stored in the TV 500 or the STB 400 such that program or channel zapping time is as quick as in live broadcasting. Such a function may be realized since the number of recommended programs is limited. An actually realized example will hereinafter be described. It is assumed that the number of recommended programs is about 20. Since the average number of programs generally viewed by individuals per day is about 10, however, it is possible to satisfy desires of users within the 20 recommended programs as long as a recommendation algorithm is properly operated. If a first 30 second portion of each program is previously downloaded, a total of 10 minutes of video files are stored in a temporary space of the TV 500 or the STB 400. Consequently, functions of the network 300, the TV 500, or the STB 400 are not substantially affected. During program or channel search, therefore, only 5 to 10 seconds of the heat portion of a VOD file is reproduced. If 15 to 20 seconds of the head portion of a program is reproduced, which means that this program has been selected, the remaining portion of the program after 30 seconds may be continuously reproduced through additional connection in the background within the remaining 10 seconds during reproduction of the head portion of the program.

Figure 4:
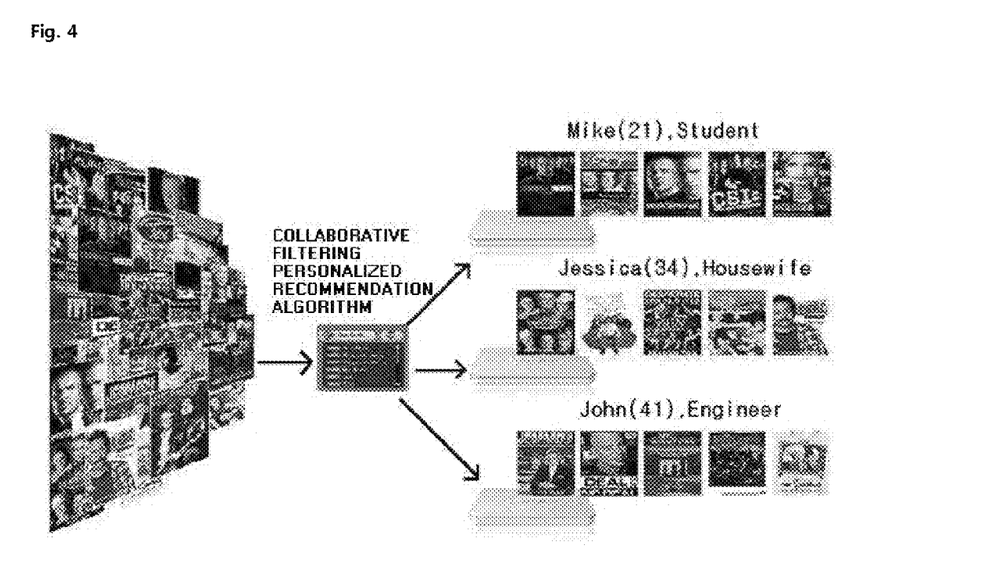
FIG. 4 is a view showing an example of a personalized recommended program list generated by a collaborative filtering algorithm according to the present invention.

Consequently, the present invention has an epoch-making effect in that even in a current TV service situation, in which a large number of programs are provided, as shown in FIG. 4, desired programs are recommended to a user through filtering, and therefore, the user watches TV while maintaining an experience that the user quickly changes channels using a remote controller to watch TV when the number of channels is small as in the past. That is, as shown in FIG. 4, different programs may be recommended to Mike, Jessica, and John in real time such that they can select desired programs. In conclusion, different recommended program lists may be provided to individual users. Also, as shown in FIG. 3, a sponsor or advertisement program or channel may be inserted when recommended programs are changed. This is identical to insertion of an advertisement or sponsor channel, such as a home shopping channel, between principal channels as in conventional TV viewing. Consequently, it is possible to provide a new profit model to a recommended program list service provider. The advertisement or sponsor program may be forcibly or selectively provided. Also, the advertisement or sponsor program may be personalized based on tendencies of users, and therefore, it is possible to provide a customer-based target marketing function.

In conclusion, whether a user can effectively view a desired channel depends upon how quickly and accurately the personalized favorite program recommendation algorithm carries out a recommendation function. For example, an algorithm, such as Page Rank, has been prepared based on a concept that contents experientially determined or evaluated to be useful by a large number of people will be useful to a user concerned by introducing a concept of so-called collective intelligence, in which several people collaboratively search as in a search engine of Google. Even in TV programs, a recommendation algorithm has been developed on the premise that programs determined or evaluated to be fun or useful by a large number of people after viewing will be fun or useful to a user concerned. A recommendation algorithm that has been the most frequently used in recent years is a collaborative filtering method. This concept is based on the fact that products frequently purchased by people having purchasing products similar to those purchased by a user concerned will be useful to the user concerned. In the present invention, it is also assumed that programs which are being viewed or have been viewed by people having viewed programs similar to those viewed by a user concerned will be useful to the user concerned based on such a collaborative filtering algorithm.

Collaborative filtering is a method of quantifying and calculating a relationship matrix of users and programs through a memory-based collaborative filtering (CF) algorithm. Particularly, in an algorithm according to the present invention, a problem related to extension of the recommended program list generation DB 220 is solved by modeling viewing history patterns of users, calculating similarity based on such modeling to select a similar user group, and operating a recommendation algorithm in this group to reduce the degree of the modeling. Also, in order to solve a cold start problem related to users having a limited viewing history, a Bayesian theorem is applied to a model-based collaborative filtering (CF) algorithm.

Hereinafter, an embodiment in which a collaborative filtering algorithm according to the present invention is realized will be described in more detail with reference to the accompanying drawings.

Figure 5:
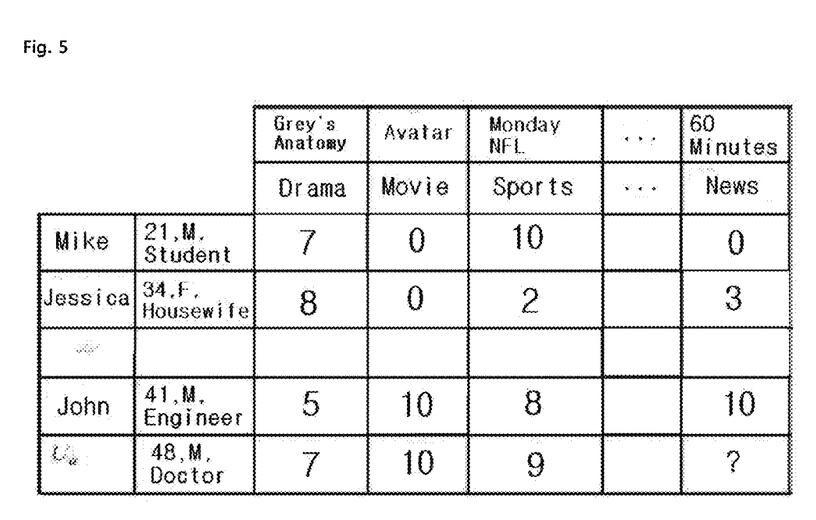
FIG. 5 is a view showing a matrix of users and programs for memory-based collaborative filtering according to the present invention.

FIG. 5 is a view showing a matrix of users and programs for memory-based collaborative filtering according to the present invention.

In FIG. 5, there is illustrated a matrix showing N users, namely, Mike, Jessica, etc, and favorite values v of M programs, such as Grey's Anatomy, Avatar, etc. In FIG. 5, $v_{ij}$ indicates a favorite degree of an i-th user to a j-th program. In the present invention, values of the favorite degree are defined between 0 and 10 as follows.

That is, $$v = 5 + 4 \times (VT)/100 \quad (10 < VT < 80)$$
$$= 0 \quad (VT < 10)$$
$$= 10 \quad (VT < 80)$$

Where, VT is viewing time percentage (%). If VT is 10% or less, it is determined that there is no favorite degree. If VT exceeds 10%, it is determined that there is a favorite degree and it is defined that the value of the favorite degree is 5. If VT exceeds 80% or more, it is defined that the value of the favorite degree is 10.

A prediction value $P_{a,j}$ of the favorite degree of an active user Ua to a new program j (for example, '60 minutes,' which is a current affairs program) is defined as follows.

$$p_{a,j} = \bar{v}_a + k \sum_{i=1}^{n} w(a, i)(v_{i,j} - \bar{v}_i)$$

Where, k indicates a normalization coefficient, and ω(a,i) indicates a weighted value to n similar users. Va indicates a favorite degree, and V(i,j) is a favorite degree of a user Ui to a program j.

A weighted value based on a degree of similarity to a similar user i is calculated as follows.

$$w(a, i) = \frac{\sum_j (v_{a,j} - \overline{v}_a)(v_{i,j} - \overline{v}_i)}{\sqrt{\sum_j (v_{a,j} - \overline{v}_a)^2 \sum_j (v_{i,j} - \overline{v}_j)^2}}$$

Where, $V_{a,j}$ indicates a favorite degree of a user Ua to a program j.

The same method as the above calculation method is applied to other new programs to compare all calculated values and prepare a recommended program list in order of value. According to the present invention, if much more metadata can be used, it is possible to improve reliability of a recommended program list using data, such as age, sex, and occupation of users and genre of programs. Also, a larger number of users use the algorithm, such as Page Rank of Google, and therefore, the present invention provides a system that is capable of further improving accuracy using a learning function.

Figure 6:
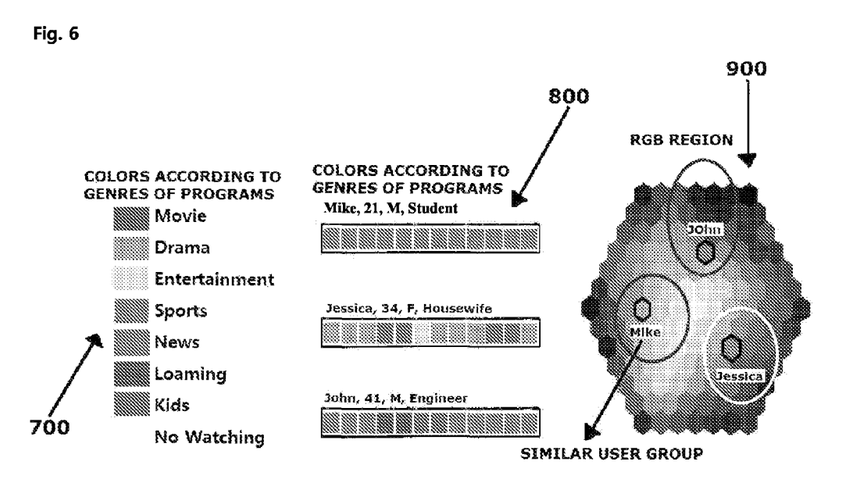
FIG. 6 is a view showing a viewer's genetic code according to the present invention.

In this case, the most important thing is whether extension is possible when the number of users and programs is increased. In particular, such a recommended program list must be provided in real time, and therefore, it is very important to improve calculation time. Consequently, a method of dividing a matrix equation of FIG. 5 into several small matrices with verified performance is very important in securing such extension. To this end, in the present invention, a viewer's viewing pattern is defined as a viewer's genetic code configured in the form of a color bar code as one inventive idea, and average red, green, and blue (RGB) values thereof are mapped on an RGB plane to set quantitative modeling for grouping similar viewers. That is, as shown in FIG. 6 showing a viewer's genetic code according to the present invention, programs are defined as color values 700 using metadata, such as genres of programs, and an average viewing pattern of each viewer is defined as a viewer's genetic code (VGC) having a color bar code form 800 with respect to a main viewing time zone. For example, main viewing time of TV, i.e. 6 hours, from 6 to 12 PM, is divided into 30 minute sections, and these divided values are indicated as average values of the color values of the recently (about one month) viewed programs in the respective sections. Individual color bar codes prepared as described above are defined as individual viewer's genetic codes, and average colors obtained by mixing the color values and the color bar codes are displayed on a two-dimensional RGB plane 900. When an arbitrary viewer is adjacent to the displayed position, the viewer is defined as a similar viewer. On the other hand, when an arbitrary viewer is distant from the displayed position, the viewer is defined as not a similar viewer. In this way, a similar viewer group within a predetermined radius may be defined. If a matrix of viewers and programs for a collaborative filtering algorithm is generated in a similar viewer group to which a corresponding viewer belongs, therefore, it is possible to reduce the size of the matrix. That is, only programs that similar viewers in the similar viewer group view or have interest in are included, and therefore, it is possible to sharply reduce not only the number of viewers but also the number of programs that the viewers have interest in. As a viewer group is increased, the viewer group may be subdivided as in cell division such that the viewer group can be extended. Such a VGC has inherent viewing characteristics for individual viewers like genes. Also, the VGC has characteristics in that the VGC is evolved with the passage of time or when a new TV viewer is added to the same household, through abrupt genetic variation like mutation, and therefore, the VGC can be transferred to another similar viewer group. This is an effective method of primarily grouping viewers, which shows individualization characteristics based on colors. Consequently, it is possible to provide an individual information protection function through anonymity of individuals.

According to the present invention, a personalized real-time 'recommended program list' is generated such that only programs worth personally viewing are selected from a large number of programs and displayed in order. Consequently, it is possible to search and select programs in the recommended program list, thereby achieving very efficient and useful TV viewing. This is similar to that most desired contents can be found from 10 to 20 content items displayed on the first search page obtained through Google search on the Internet. If more detailed search is necessary, the next recommended program list may be requested. Alternatively, escape from the recommended program menu may be carried out, and conventional methods, such as the use of a hierarchical menu or text input in a search window, may also be used.

Although a system for recommending personalized favorite programs or channels to IPTV users based on a collaborative filtering algorithm according to an embodiment of the present invention has been described with reference to the accompanying drawings, the above description is to be construed in all aspects as illustrative and not restrictive. The scope of the invention should be determined by reasonable interpretation of the appended claims and all changes coming within the equivalency range of the invention are intended to be embraced in the scope of the invention.

As is apparent from the above description, according to the present invention, a personalized real-time 'recommended program list' is generated such that only programs worth personally viewing are selected from a large number of programs and displayed in order. Consequently, it is possible to search and select programs in the recommended program list, thereby achieving very efficient and useful TV viewing. This is similar to that most desired contents can be found from 10 to 20 content items displayed on the first search page obtained through Google search on the Internet. If more detailed search is necessary, the next recommended program list may be requested. Alternatively, escape from the recommended program menu may be carried out, and conventional methods, such as the use of a hierarchical menu or text input in a search window, may also be used.

Also, on the assumption that the number of programs in the recommended program list is limited to about 20, a head portion (for example, first 30 second portion) of each of the programs is previously downloaded in a TV such that the head portion of each of the programs can be immediately displayed when each of the programs is searched or selected. Particularly in a case in which live channels are served based on the conventional systems (terrestrial broadcasting, cable broadcasting, and satellite broadcasting systems) and VOD programs are served based on the IPTV system as in a hybrid TV, these channels and programs are mixed in the recommended program list, in which these channels and programs are listed in order. When change is carried out from a live channel to a VOD program, considerable delay occurs. Since the head portion of the VOD program is already stored in the recommended program list, however, the VOD program is displayed in a seamless fashion. Therefore, it is possible to achieve convenient viewing in the same manner as when changing channels using a remote controller in a state in which the user reclines when the number of channels is small.

Also, a high favorite degree of unpopular niche channels or hidden programs may be generated in a similar user group based on a collaborative algorithm, and therefore, it is possible to generate a long tail TV program market.

Also, it is very important to expose programs in the recommended program list in an aspect of marketing, and therefore, it is possible to provide a useful advertisement business model such as AdSense of Google. That is, some of the programs in the recommended program list are assigned and inserted midway as advertisement broadcasts or associative sponsor programs as in a home shopping TV, thereby achieving natural viewing when programs are changed.

DRAWINGS

FIG. 1A
10: SEARCH ENGINE
FIG. 2
100: BROADCAST PROVIDER
200: SERVICE SERVER
300: NETWORK
210: BROADCAST INFORMATION DB
220: RECOMMENDED PROGRAM LIST GENERATION DB
230: OTHER INFORMATION DB
FIG. 3
서비스 브랜드: SERVICE BRAND
광고/스폰서 채널: ADVERTISEMENT/SPONSOR CHANNEL
추천목록: RECOMMENDED PROGRAM LIST
현재 시청채널: CURRENTLY BROADCAST CHANNEL
FIG. 4
협동 필터링 개인화 추천 알고리즘: COLLABORATIVE FILTERING PERSONALIZED RECOMMENDATION ALGORITHM
FIG. 6
프로그램 장르별 색상 구분: COLORS ACCORDING TO GENRES OF PROGRAMS
프로그램 장르별 색상 구분: COLORS ACCORDING TO GENRES OF PROGRAMS
RGB 영역: RGB REGIONS
유사 시청자 그룹: SIMILAR USER GROUP

What is claimed is:

1. A system for recommending personalized favorite programs or channels to internet protocol television (IPTV) users, the system comprising:
   a broadcast provider as an IPTV broadcast provider that provides users with TV contents through the Internet;
   a service server to receive a broadcast signal and program information from the broadcast provider, to store corresponding information in respective databases, to calculate the program information based on a recommendation algorithm to quantitatively calculate priority based on a relationship matrix of multiple users and programs, and to list the program information in recommendation order based on the currently broadcast or reproduced program;
   a relay device to receive recommended program list information and a broadcast signal from the service server and to transmit the recommended program list information personalized to each user in real-time and the broadcast signal through a network;
   a TV to output the recommended program list information and the broadcast signal from the relay device;
   wherein the service server comprises:
   a broadcast information database (DB) to store program information for each channel or each time zone received from the broadcast provider in real time;
   a recommended program list generation DB to provide a user with the personalized recommended program list in real time using a collaborative filtering method of quantifying and calculating the relationship matrix of arbitrary users and arbitrary programs through a memory-based collaborative filtering (CF) algorithm; and
   an other information DB to store other information data; and
   wherein a favorite degree V quantified in the relationship matrix of the arbitrary users and the arbitrary programs is calculated by the following equation;

$$v = 5 + 4 \times (VT)/100 \quad (10 < VT < 80)$$
$$= 0 \quad (VT < 10)$$
$$= 10 \quad (VT < 80)$$

wherein VT is viewing time percentage (%); if VT is 10% or less, it is determined that there is no favorite degree; if VT exceeds 10%, it is determined that there is a favorite degree and it is defined that the favorite degree is 5; if VT exceeds 80% or more, it is defined that the favorite degree is 10.

2. The system according to claim 1, wherein the recommended program list is prepared according to recommendation priority calculated by a program rank, and the program rank is based on an algorithm to calculate quantitative order set based on collective intelligence through collaborative filtering according to information based on which several users prefer, select, and view programs.

3. The system according to claim 1, wherein the recommended program list is a list comprising a restricted number of high-ranking programs selected from a large number of programs, a problem related to extension of the recommended program list generation DB due to increase in number of users and programs in the algorithm is solved by modeling viewing history patterns of users, calculating similarity based on such modeling to select a similar user group, and operating a recommendation algorithm in this group to reduce a degree of the modeling, and a Bayesian theorem is applied to a model-based collaborative filtering (CF) algorithm in order to solve a cold start problem related to users having a limited viewing history.

4. The system according to claim 3, wherein head portions of the recommended programs to be reproduced are previously downloaded in the relay device or the TV in real time such that the programs are immediately displayed during search or selection of the programs as in a currently broadcast program since the number of the recommended program list is limited, thereby achieving quick and uniform movement between a live broadcast and a reproduced program, and, when a program to be reproduced is selected, the remaining portion of the program connected to the head portion of the program is continuously reproduced during reproduction of the head portion of the program.

5. The system according to claim 3, wherein titles or representative images of recommended programs in the recommended program list are listed, a desired program is selected using up and down buttons of a remote controller, or the recommended program list is scrolled up and down using the remote controller after the recommended program list disappears to broadcast or reproduce a program selected from recommended programs through a change function, a sponsor or advertisement program or channel is inserted when the recommended programs are changed, and the advertisement or sponsor program is forcibly or selectively provided and personalized based on tendencies of users.

6. The system according to claim 1, wherein, if the number of the arbitrary users is n, an active user is Ua, and a new program is j, a prediction value $P_{a,j}$ of the favorite degree of the active user Ua to the new program j is defined by the following equation;

$$p_{a,j} = \overline{v}_a + k \sum_{i=1}^{n} w(a,i)(v_{i,j} - \overline{v}_i)$$

wherein k indicates a normalization coefficient, and w(a,i) indicates a weighted value to n similar users; Va indicates a favorite degree, and V(i,j) is a favorite degree of a user Ui to a program j; w(a, i) is calculated by the following equation;

$$w(a,i) = \frac{\sum_{j}(v_{a,j} - \overline{v}_a)(v_{i,j} - \overline{v}_i)}{\sqrt{\sum_{j}(v_{a,j} - \overline{v}_a)^2 \sum_{j}(v_{i,j} - \overline{v}_i)^2}}$$

wherein $V_{a,j}$ indicates a favorite degree of a user Ua to a program j.

7. The system according to claim 1, wherein the relationship matrix of the arbitrary users and the arbitrary programs is divided into several small similar user groups with verified performance to secure extension.

8. The system according to claim 7, wherein a viewing pattern of each of the arbitrary users is defined as a viewer's genetic code configured in the form of a color bar code, average red, green, and blue (RGB) values of the viewer's genetic code is mapped on a two-dimensional RGB plane to set quantitative modeling for grouping similar viewers, color values of the programs are defined using metadata, such as genres of the respective programs, an average viewing pattern of each viewer is defined as a viewer's genetic code (VGC) having a color bar code form with respect to a main viewing time zone, the generated individual color bar codes are defined as individual viewer's genetic codes, and average colors obtained by mixing the color values and the color bar codes are displayed on the two-dimensional RGB plane such that when an arbitrary viewer is adjacent to the displayed position, the viewer is defined as a similar viewer, and when an arbitrary viewer is distant from the displayed position, on the other hand, the viewer is defined as not a similar viewer.

* * * * *